United States Patent
White et al.

[11] Patent Number: 5,964,206
[45] Date of Patent: Oct. 12, 1999

[54] FUEL SUPPLY COOLING SYSTEM FOR AN INTERNAL COMBUSTION ENGINE

[75] Inventors: Brian R. White; Vince E. Notareschi; Grant W. Hines; Matthew W. Jaeger, all of Stillwater, Okla.

[73] Assignee: Brunswick Corporation, Lake Forest, Ill.

[21] Appl. No.: 09/073,785

[22] Filed: May 6, 1998

[51] Int. Cl.[6] .................................................. F02M 37/04
[52] U.S. Cl. ............................................................ 123/541
[58] Field of Search .................................... 123/541, 557, 123/543, 545, 546

[56] References Cited

U.S. PATENT DOCUMENTS

| | | | |
|---|---|---|---|
| 2,120,779 | 6/1938 | Ericson | 123/541 |
| 3,835,822 | 9/1974 | Mickle et al. | 123/41.31 |
| 4,072,138 | 2/1978 | Hawkins et al. | 123/541 |
| 4,155,337 | 5/1979 | Hensley | 123/541 |
| 4,411,239 | 10/1983 | Kelch | 123/541 |
| 4,768,492 | 9/1988 | Widmer et al. | 123/541 |
| 4,848,283 | 7/1989 | Garms et al. | |
| 4,865,004 | 9/1989 | Widmer et al. | 123/541 |
| 4,875,439 | 10/1989 | Widmer et al. | 123/541 |
| 5,103,793 | 4/1992 | Riese et al. | |
| 5,389,245 | 2/1995 | Jaeger et al. | |
| 5,400,750 | 3/1995 | Jaeger et al. | |
| 5,408,971 | 4/1995 | Jaeger et al. | |
| 5,443,046 | 8/1995 | White | 123/438 |
| 5,551,404 | 9/1996 | Bauerle et al. | 123/541 |
| 5,832,903 | 11/1998 | White et al. | 123/541 |

Primary Examiner—Marguerite McMahon
Attorney, Agent, or Firm—William D. Lanyi

[57] ABSTRACT

A fuel supply system is provided with a heat exchanger disposed in a generally planer cavity within a base. A manifold attaches to the base and contains the generally planer cavity. A heat exchanger, which comprises a fuel conduit, is disposed within the cavity. As fuel flows from a fuel pump to a fuel injection system of an internal combustion engine, it passes through the fuel conduit which is bathed in a flow of coolant. Some of the fuel flows directly from the fuel conduit to the fuel injection system, but excess fuel flows through a pressure regulator and a filter before being passed through the pump again to recirculate through the fuel conduit of the cooler. The quantity of fuel stored within the volume of the fuel supply system is significantly reduced because of the location of the various components and the fact that the components, such as the filter, regulator, and pump are attached directly to the base of the system. This reduces the need for interconnecting tubing or hoses and the resulting reduced amount of fuel stored in the system can be cooled much more rapidly when the engine is restarted.

20 Claims, 5 Drawing Sheets

FUEL SUPPLY COOLING SYSTEM FOR AN INTERNAL COMBUSTION ENGINE

BACKGROUND OF THE INVENTION

1. Field of the Invention

The present invention is generally related to a fuel supply system for an internal combustion engine and, more particularly, to a fuel supply system that reduces the temperature of the fuel as the fuel is recirculated prior to flowing to a fuel injection system for an internal combustion engine.

2. Description of the Prior Art

Many different types of fuel supply systems are well known to those skilled in the art. In certain types of fuel supply systems which are used in conjunction with marine vessels, the fuel system supplies fuel from a boat fuel tank to an electronic fuel injection system for an internal combustion engine used to propel the boat. Fuel is provided to the fuel injectors which inject fuel into cylinder air intake runners at a relatively constant pressure above the air intake manifold pressure. In engines which use continuous-duty fuel pumps, excess fuel which is not immediately needed by the fuel injectors is typically returned to a main fuel tank or recirculated for subsequent injection by the fuel injectors.

In systems that use vapor separators, the vapor separator is typically located in the fuel line between the fuel tank and the engine and usually comprises a container into which the fuel is pumped. The purpose of vapor separators is to remove vapor or air from the fuel stream so that liquid fuel is present on the upstream, or low pressure, side of the fuel pump. The purpose of a fuel vapor separator is to prevent vapor lock from occurring. If a vapor separator is not used, pump vapor lock can occur, particularly when the engine is idling, due to heat generated in the fuel stream by the electric fuel pump or because of engine heat soak after the engine has been shut down and restarted after a relatively short period of time. Since gasoline boils or vaporizes easily at atmospheric pressures, a fuel supply system that does not include a vapor separator, must efficiently cool the fuel to avoid vapor lock.

U.S. Pat. No. 3,835,822, which issued to Mickle et al on Sep. 17, 1974, discloses a cooled fuel pump for an internal combustion engine. The fuel pump is intended for use with water-cooled marine engines and includes a cast aluminum housing. A water cooling tube is imbedded in the housing connected directly to the inlet of the main cooling system for the engine such that upon initial starting of the engine, cooling water is immediately supplied to the fuel pump to reduce its temperature, and thereby eliminate vapor lock conditions. The tube may be formed of suitable material to minimize electrolytic conditions with respect to the cast housing and prevent possible leakage of water into the fuel system.

U.S. Pat. No. 4,768,492, which issued to Widmer et al on Sep. 6, 1988, describes a marine propulsion system with a fuel line cooler. The cooler is provided for a marine propulsion system having a water cooled internal combustion engine in a heat retentive compartment. The fuel line cooler has an inlet in communication with the source of cooling water for the engine, and has an outlet for discharging water. The fuel line cooler is cooled by sea water during running of the engine. Upon turning off the engine, the cooled water in the fuel line cooler is in heat transfer relation with the fuel and prevents vaporization and/or spewing of the fuel.

U.S. Pat. No. 4,848,283, which issued to Garms et al on Jul. 18, 1989, discloses a marine engine with combination fuel return, crankcase pressure, and cooled fuel line conduit. The marine propulsion system includes a two cycle water cooled crankcase compression internal combustion engine including a vapor separator, a remote fuel tank, and a fuel pump in the tank for delivering fuel to the engine in response to the crankcase pulse pressure. A combination conduit between the fuel tank and the engine includes a first passage communicating crankcase pulse pressure from the engine to the fuel pump in the tank, a second passage supplying fuel from the pump in the tank to the engine, a third passage returning fuel vapor from the vapor separator at the engine back to the tank, a fourth passage supplying cooling water from the engine towards the tank, and a fifth passage returning water from the fourth passage back to the engine.

U.S. Pat. No. 4,865,004, which issued to Widmer et al on Sep. 12, 1989, describes a marine propulsion system with a fuel line cooler. The cooler is provided for a marine propulsion system having a water cooled internal combustion engine in a heat retentive compartment. The fuel line cooler has an inlet in communication with the source of cooling water for the engine, and has an outlet for discharging water. The fuel line cooler is cooled by sea water during running of the engine. Upon turn-off of the engine, the cooled water in the fuel line cooler is in heat transfer relation with the fuel and prevents vaporization and/or spewing of the fuel.

U.S. Pat. No. 4,875,439, which issued to Widmer et al on Oct. 24, 1989, discloses a marine propulsion system with a fuel line cooler that is generally similar to the system disclosed in U.S. Pat. No. 4,865,004 and described above.

U.S. Pat. No. 5,389,245, which issued to Jaeger et al on Feb. 14, 1995, discloses a vapor separating unit for a fuel system. The unit has particular application to a fuel system for marine engines. The vapor separating unit includes a closed tank having a fuel inlet through which fuel is fed to the tank by a diaphragm pump. The liquid fuel in the tank is controlled by a float-operated valve. An electric pump is located within the vapor separating tank and has an inlet disposed in the tank and an outlet connected to a fuel rail assembly of the engine. Excess fuel from the fuel rail assembly is conducted back into the upper end of the vapor end of the vapor separator tank. A vapor venting mechanism is incorporated in the tank to vent vapor from the tank.

U.S. Pat. No. 5,103,793, which issued to Riese et al on Apr. 14, 1992, describes a vapor separator for an internal combustion engine. The vapor separator assembly includes a bowl member and a cover member. The fuel pump is located in the internal cavity of the bowl member and has an inlet located in the lower portion of the bowl member cavity, for supplying fuel thereto. The fuel pump is secured in position within the bowl member by engagement of the cover member with the fuel pump. The cover member includes a mounting portion for mounting a water separating filter element to the vapor separator assembly. The cover member includes structure for routing fuel from the discharge of the water separating filter element to the interior of the bowl member cavity. A compact arrangement is thus provided for the vapor separator, the fuel pump, and the water separating filter, eliminating a number of hose connections between such components as well as facilitating assembly.

U.S. Pat. No. 5,443,046, which issued to White on Aug. 22, 1995, describes an efficiently pumped fuel supply system. In a low pressure continuous flow fuel injection system for an internal combustion system, an electric fuel pump is energized with a variable duty cycle to vary the pump volume output of the pump according to engine fuel requirements. The duty cycle is varied to energize the pump to pump substantially only the amount of fuel required by the engine, such that at idle or low engine speed, the pump is energized a lower percentage of the time than at high engine speed. Fuel flow through the fuel injector is continuous, but energization of the pump is not, such as the pump is not pumping at full capacity when unneeded. An electric idle air control valve is also energized with a variable duty cycle to vary the amount of bypass idle air supplied to the intake manifold.

U.S. Pat. No. 5,400,750, which issued to Jaeger et al on Mar. 28, 1995, describes a manifold and plenum construction for an electric fuel injected engine. The manifold includes a plurality of parallel runners, with each runner having a lower end communicating through a port in the cylinder head with a cylinder of the engine, and an open upper end. A fuel injector is mounted in each runner for injecting fuel into the runner. A plenum is mounted on the manifold and includes an upper wall and a lower wall which is spaced from the upper wall to define an air chamber. The upper ends of the runners communicate with the chamber, so that air is drawn from the chamber through the runners to the cylinders. A flange is spaced from the upper end of each runner, and the lower wall of the plenum is supported on the flanges so that the upper end of each runner projects into the plenum chamber. Hollow posts extend between the upper and lower walls of the plenum and bolts extend through the hollow posts and are threaded into the flanges on the runners in order to connect the plenum to the manifold.

U.S. Pat. No. 5,408,971, which issued to Jaeger et al on Apr. 25, 1995, discloses a fuel rail construction for an electronic fuel injected engine. The assembly includes an elongated rail having a longitudinal inlet passage and a longitudinal outlet passage. The upstream end of the inlet passage is connected to a fuel supply line while the downstream end of the inlet passage is connected through a pressure regulator to the upstream end of the outlet passage. A return fuel line is connected to the downstream end of the outlet passage. A plurality of injector bores communicate with the inlet passage and extend to the exterior of the rail and each injector bore receives one end of a fuel injector, while the opposite end of each injector is sealed within a bore in a runner of an intake manifold. The injectors are mounted in a manner to provide limited tilt to facilitate assembly with the bores in the fuel rail of the manifold reservoir.

All of the U.S. Patents described above are hereby expressly incorporated by reference in this description.

U.S. patent application Ser. No. 08/866,962, which was filed on Jun. 2, 1997, by White et al and assigned to the assignee of the present application discloses a fuel supply system for an internal combustion system. The fuel supply system is intended for use with a marine propulsion system having an electronically controlled fuel injection system. It eliminates the need for a vapor separator. The system pumps an excessive amount of fuel through a plumbed fuel supply loop and cools recirculated fuel to cool all of the components of the plumbed fuel supply loop, i.e. a continuous duty, constant displacement fuel pump; a pressure regulator; and a water separating fuel filter. Recirculated fuel flows from the pressure regulator to the water separating fuel filter as does make-up fuel from a fuel tank. The fuel stream from the water separating fuel filter flows to the low-pressure side of the fuel pump, which pumps the fuel through the plumbed fuel supply loop. A fuel injection portion of the fuel flows to the engine for combustion, while the remaining portion of the fuel is recirculated. The recirculated portion of the fuel is cooled, preferably using a water-cooled heat exchanger. The cooled, recirculated fuel passes through the pressure regulator and repeats its recirculation to the water separating fuel filter.

The fuel supply system described immediately above represents a significant improvement in performance over prior systems. However, it would be additionally beneficial if an improved version of the fuel supply system could be provided which reduces the volume of fuel stored within the fuel supply system when the engine is shut off, provides improved thermal characteristics to cool the liquid fuel and other components of the fuel system, and requires less volumetric space and a lower number of components than existing fuel systems.

SUMMARY OF THE INVENTION

A fuel supply system made in accordance with the present invention comprises a base having a cavity formed therein and a fuel conduit disposed within the cavity. A manifold directs a coolant into the cavity in thermal communication with the fuel conduit. A fuel pump is attached to the base with an outlet of the pump being connected to a first passage in the base in fluid communication with an inlet end of the fuel conduit. A filter is attached directly to the base with an outlet of the filter being connected through a second passage in the base in fluid communication with an inlet of the pump. An inlet of the filter is connected in fluid communication with a fuel tank and an outlet end of the fuel conduit is connected in fluid communication with a fuel system of the internal combustion engine.

The present invention can also comprise a heat insulating housing which contains the base, the manifold, the fuel pump, and the filter. The base can be made of metal, such as aluminum, or it can alternatively be made of a non-metal material such as plastic or ceramic. The fuel conduit can be formed in a thin sheet of metal by pressing a serpentine pattern into the thin sheet. Alternatively, the fuel conduit can be formed by machining a channel into a surface of a metallic plate. Furthermore, another alternative of the present invention comprises a fuel conduit, that, in turn, comprises a metallic tube disposed within the cavity of the base with the inlet of the fuel conduit being connected to the first passage in the base and the outlet of the fuel conduit being connected to a third passage in the base. The metallic tube can be bent into a serpentine shape or a spiral shape. In a particularly preferred embodiment of the present invention, the cavity in the base is a generally planer cavity formed within the base and contained between the base and the manifold.

The structure of the present invention reduces the overall volume of fuel stored within the fuel supply system. This reduction in volume is achieved by eliminating most of the tubing that would otherwise be used to conduct fuel from one point to another. The amount of tubing is reduced by attaching many of the components directly to the base. This direct connection of components to the base also improves the cooling effect on the components caused by the heat exchanger portion of the present invention.

BRIEF DESCRIPTION OF THE DRAWINGS

The present invention will be more fully and completely understood from a reading of the description of the preferred embodiment in conjunction with the drawings in which.

DESCRIPTION OF THE PREFERRED EMBODIMENT

Figure 1:
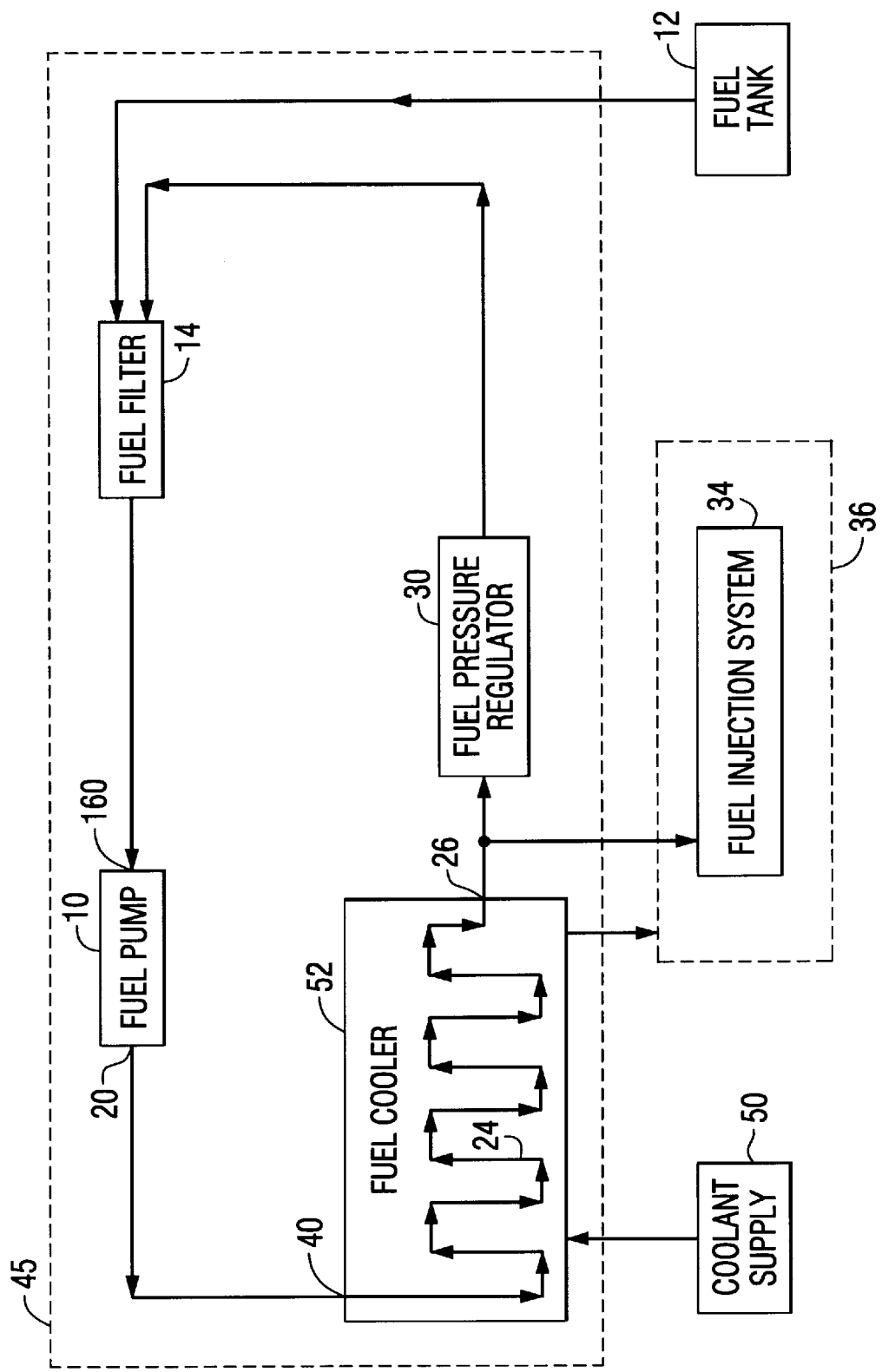
FIG. 1 is a schematic illustration of the fuel supply system of the present invention.

Throughout the description of the preferred embodiment, like components will be identified by like reference numerals.

FIG. 1 is a simplified schematic of the fuel supply system of the present invention. A fuel pump 10 draws fuel from a fuel tank 12 and through a water-separating fuel filter 14. From the outlet 20 of the pump, the fuel is caused to flow through a fuel conduit 24 within a fuel cooler, or heat exchanger, portion of the present invention. The fuel then flows from an outlet 26 of the fuel conduit 24 to a device for maintaining pressure control of the fuel within the system. This device can be a fuel pressure regulator 30 or, alternatively, a check valve with a relief valve capability. Some of the fuel flows directly from the outlet 26 of the fuel conduit 24 to the fuel injection system 34 of an internal combustion engine 36. Excess fuel, which passes from the fuel conduit 24 to the pressure regulator 30, flows back to the fuel filter 14, and recirculates back to the fuel pump and then to the inlet 40 of the fuel conduit 24. A coolant supply 50, such as a water pump, supplies coolant, such as lake or sea water to the fuel cooler 52. The coolant is caused to flow in thermal communication with the fuel conduit 24 to reduce the temperature of fuel flowing through the fuel cooler 52. The coolant then flows from the fuel cooler to the cooling system of the internal combustion engine 36.

Figure 2:
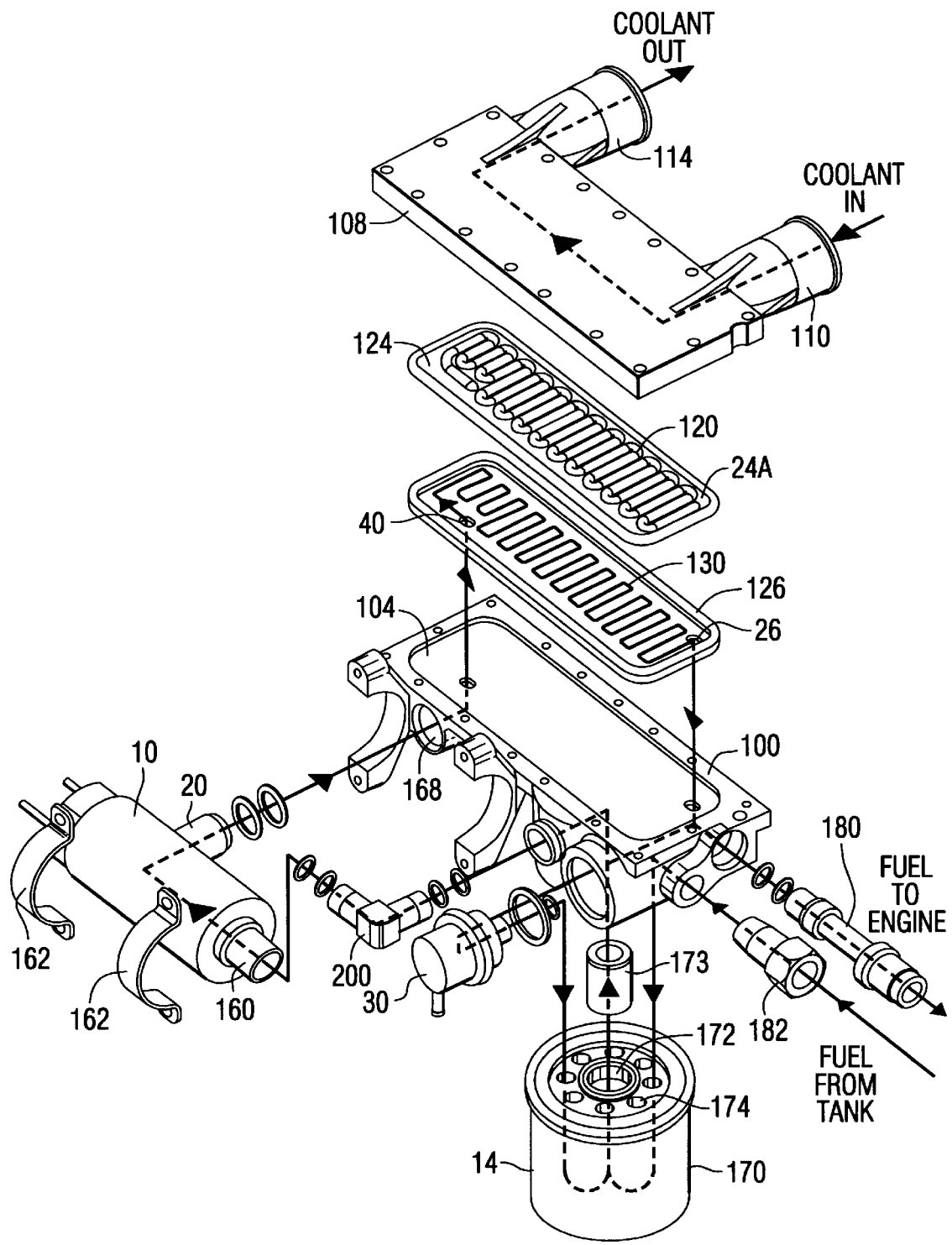
FIG. 2 is an exploded view of one embodiment of the present invention using a pressed sheet of metal to form a fuel conduit.

FIG. 2 is an exploded view of one embodiment of the present invention, accompanied by flow identifying arrows. The present invention shown in FIG. 2 comprises a base 100 which has a cavity 104 formed therein. In a preferred embodiment of the present invention, the cavity 104 is a generally planer cavity and is contained between the base 100 and a coolant manifold 108. The coolant manifold 108 receives a coolant, such as sea water or lake water, at its inlet 110 and passes the coolant through the cavity 104 toward the outlet 114 of the manifold 108. Within the cavity of the base 100, a fuel conduit is disposed. As will be described in detail below, the fuel conduit can be in several different forms and constructions. In FIG. 2, the fuel conduit 24A is formed by pressing a serpentine pattern 120, or other shapes of depressions, into a thin sheet of metal 124. The fuel conduit 24A is then placed in contact with a seal 126 to define a serpentine path 130 therebetween. Between the pressed indentations formed in the underside of the thin metallic sheet 124 and the seal 126, which can be made of rubber or plastic, the serpentine path 130 is defined for passage of fuel.

With continued reference to FIG. 2, a fuel pump 160 is attached to the side of the base 100 by clamps 162. A filter 170 is attached directly to the base 100. An outlet 172 of the filter 170 is connected, through a second passage (not shown in FIG. 2) formed in the base and providing fluid communication with an inlet 162 of the pump 160. The inlet 174 of the filter 170 is connected in fluid communication with a fuel tank. The outlet end 26 of the final conduit 24A is connected in fluid communication with a fuel system of an internal combustion engine which is connected to the fuel line 180. The fitting 182 provides a connection to a fuel line from the fuel tank 12. Excess fuel, which does not pass directly from the outlet 26 of the fuel conduit 24A, recirculates through the pressure regulator 30 and back to the filter 14. From there, it is drawn to the inlet 160 of the pump 10 and is pumped from the outlet 20 of the pump 10 to the inlet 40 of the fuel conduit 24A through the first passage 168 which is formed in the base 100.

Also shown in FIG. 2 is an elbow 200 which provides a connection between the inlet 160 of the pump 10 and the second passage formed in the base to provide fluid communication between the pump 10 and the outlet 172 of the filter 14. Also shown in FIG. 2 are the various O-rings used to seal the flow of fuel through the system. Not shown in FIG. 2 are the plurality of fasteners used to attach the manifold 108 to the base 100 and the pump 10 to the base 100.

When the manifold 108 is attached to the base 100, it encloses the generally planer cavity 104. Disposed within the generally planer cavity 104 are the plate 124 and seal 126 which, together, form the fuel conduit 24A defined by the depressions pressed into the underside of the sheet 124. From the outlet 20 of the pump 10, the fuel flows through the first passage 168 and upward through the seal 126. At the inlet 40 of the fuel conduit 24A, the fuel begins a tortuous serpentine path that ends at the outlet 26 of the fuel conduit 24A. It should be understood that coolant is continually flowing over the upper surface of the sheet 124 and withdrawing heat from it. As a result, the fuel flowing through the fuel conduit 24A is cooled as it passes from the inlet 40 to the outlet 26. From the outlet 26, the fuel flows down through the bottom surface of the generally planer cavity 104 and then either to the engine through the fuel line 180 or through the pressure regulator 30 back to the filter 14 for recirculation by the pump 10 and further cooling.

Figure 3:
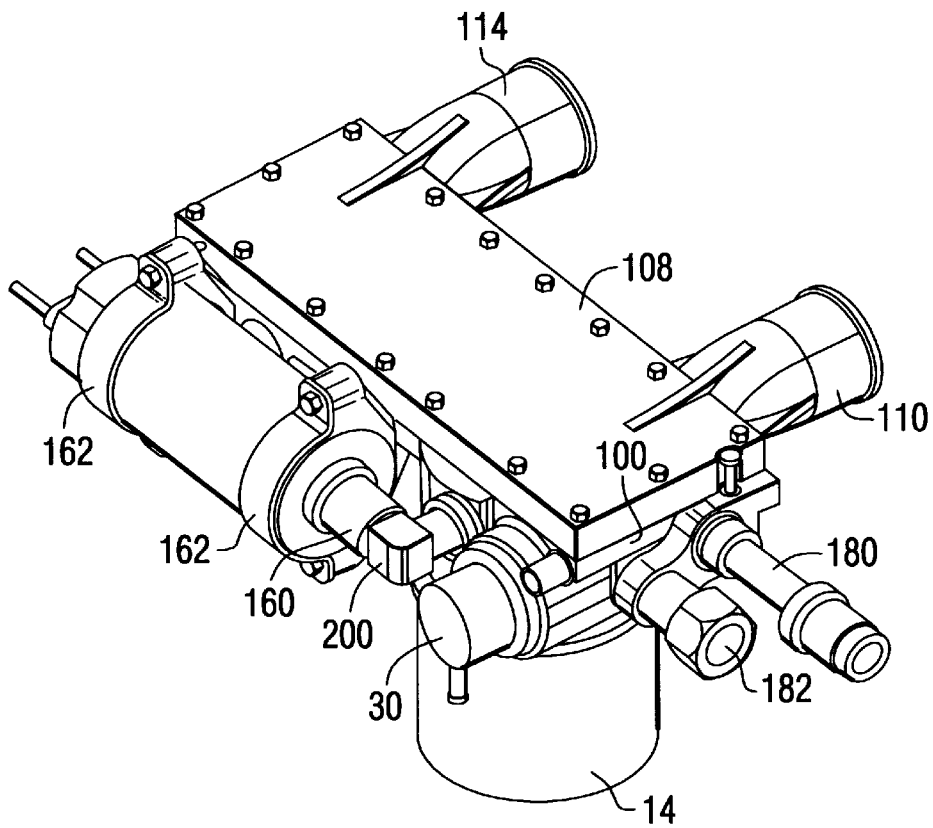
FIG. 3 shows the fuel system of FIG. 2 in an assembled state.

FIG. 3 shows the assembled system which is described immediately above in conjunction with FIG. 2. The manifold 108 is attached to the base 100, the filter 14 is attached directly to the base 100, and the pump 10 is attached to the base 100. Although not shown in FIG. 3, it should be understood that the heat exchanger element of the present invention is contained within the generally planer cavity 104 described above in conjunction with FIG. 2. The intimate contact of both the filter 14 and the pump 10 with the base 100 provides a beneficial cooling effect on the pump 10 and the filter 14. With the components of FIG. 3 disposed within a heat insulated housing 45, represented schematically in FIG. 1 and described in detail in patent application Ser. No. 08/866,962, all of the components shown in FIG. 3 are maintained at a desirably cool temperature by the effects of the heat exchanger within the generally planer cavity 104.

One of the significant advantages of the present invention can be seen in FIG. 3 by the noticeable absence of tubular connections between components of the fuel supply system. In known marine fuel supply systems, significant lengths of tubing are used to connect the various components. This can be seen in the Figures of the patent application Ser. No. 08/866,962 and other known fuel systems of the prior art. The present invention, on the other hand, virtually eliminates the need for hoses and tubing by connecting the filter 14, regulator 30, and pump 10 directly to the base 100. This direct connection of these components to the base 100 reduces the need for intermediate tubing to accomplish the fluid communication between the components. The reduction in tubing, in turn, significantly reduces the volume of stored fuel within the fuel supply system in FIG. 3 when the engine of the marine vessel is turned off. In normal systems, this significant volume of fuel can absorb heat from the internal combustion engine while the engine is shut off and, upon restarting, requires significant time to reduce the temperature of that stored and heated fuel. Since the volume of stored fuel within the system in FIG. 3 is significantly reduced, it can be cooled rapidly by the operation of the heat exchanger within the generally planer cavity 104. Also, the reduction in tubing connections reduces the cost of the fuel supply system and the space needed by the fuel supply system in the engine compartment.

Figure 4:
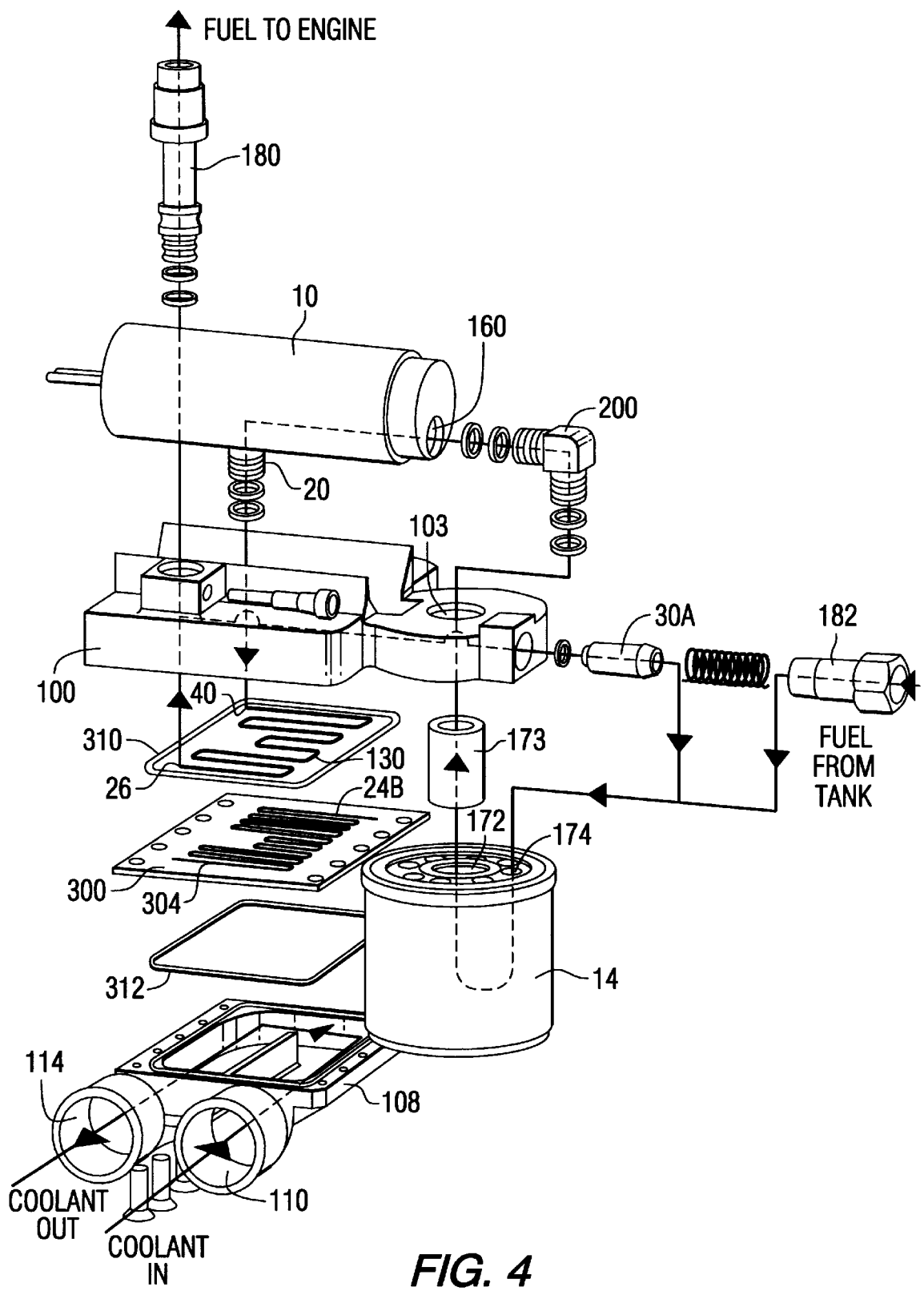
FIG. 4 is an exploded view of an alternative embodiment of the present invention which utilizes a machined plate as the fuel conduit.

FIG. 4 shows an alternative embodiment of the present invention. Between the base 100 and the manifold 108, a plate 300 is machined to define a serpentine pattern of grooves 304. An upper seal 310 and a lower seal 312 prevent leakage of the fuel flowing through the grooves 304 and the water flowing through the manifold 108. Several modifications are evident in FIG. 4 compared to the embodiment shown in FIG. 2. Instead of a normal pressure regulator 30, the embodiment shown in FIG. 4 utilizes a check/relief valve 30A. Also, the heat exchanger plate 300 is machined to define the serpentine grooves 304 rather than using a thin sheet 124 that is pressed to define the grooves 120. In addition, the manifold 108 is attached to the underside of the base 100 and the base 100 is disposed between the manifold 108 and the pump 10 rather than having the pump 10 attached to the side of the base 100 as shown in FIG. 2. However, the basic operation of the system shown in FIG. 4 is virtually identical to that of the system shown in FIG. 2. The pump 10 draws fuel from a fuel tank through the fuel line 182 and through filter 14. The fuel flows through the filter 14 and passes through its outlet 172. Aided by a conduit 173, the fuel flows upward through the base 100 and its second passage 103 to the inlet 160 of the pump 10. From the outlet 20 of the pump 10, the fuel flows to the inlet 40 of the fuel conduit 304, which is formed by the machined grooves 304 in plate 300. From the outlet 26 of the fuel conduit, the fuel flows through the fuel line 180 to the engine. However, after passing from the outlet 26 of the fuel conduit 304, the fuel can recirculate, under the control of the check/relief valve 30A, back to the filter 14 as represented by the arrows in FIG. 4.

Figure 5:
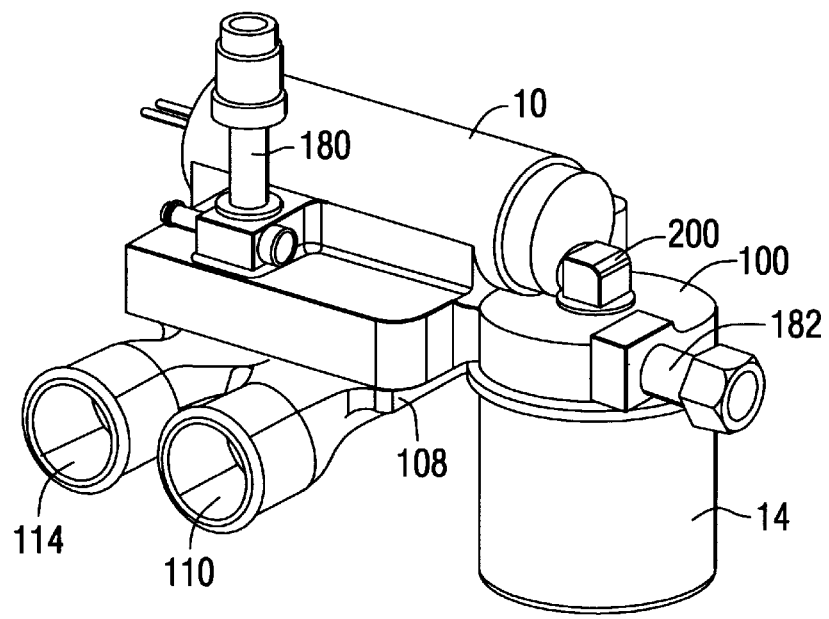
FIG. 5 is an assembled view of the fuel supply system of FIG. 4.

FIG. 5 shows the embodiment of the present invention illustrated in FIG. 4, but with the components attached together to form a single device. The pump 10 is connected in intimate thermal relation with the base 100 and the filter 14 is also attached directly to the base 100. As the coolant removes heat from the fuel within the heat exchanger disposed within the generally planer cavity (not shown) in the base 100, the reduced temperature of the fuel will also significantly cool both the pump 10 and the filter 14. As in the embodiment of FIGS. 2 and 3, the lack of tubing in FIG. 5 is also noticeable. The reduced need for tubing as an interconnection means between the components significantly reduces the volume of stored fuel within the fuel supply system when the engine is turned off. Therefore, the system is able to rapidly decrease the temperature of the fuel within the fuel supply system after the engine is restarted. The reduction in tubing and other interconnection components also significantly reduces both the cost of the fuel supply system and the volume necessary to accommodate it within the engine compartment.

Figure 6:
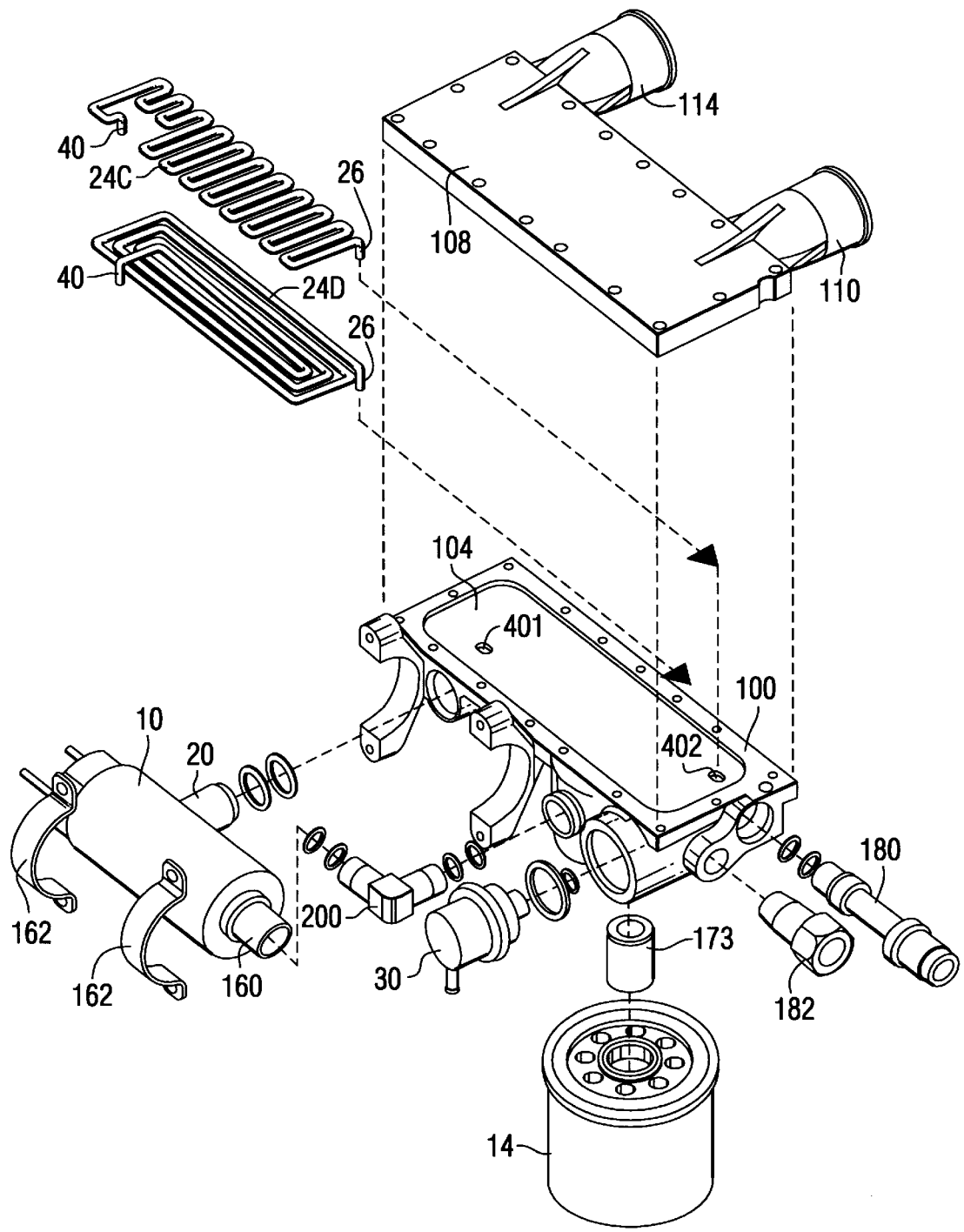
FIG. 6 shows an exploded view of a fuel supply system generally similar to FIG. 2, but showing two alternative fuel conduits that can be used in alternative embodiments of the present invention.

FIG. 6 shows another embodiment of the present invention. In this embodiment, an internal tube is used as the fuel conduit rather than the pressed sheet described in conjunction with FIG. 2 or the machined plate described in conjunction with FIG. 4. The tubing can be bent and shaped to form the serpentine pattern as represented by fuel conduit 24C in FIG. 6 or, alternatively, it can be bent and shaped to form a flat spiral as represented by fuel conduit 24D. It should be understood that the fuel conduits, 24C and 24D, are alternatives in FIG. 6 and are not typically intended to be used together. FIG. 6 shows the main components of the fuel system with both of the two alternatives, 24C and 24D, illustrated. The embodiment shown in FIG. 6 is similar to that of FIG. 2 with a base 100, a filter 14 attached directly to the underside of the base, a pump 10 attached to the side of the base, and a coolant manifold 108 attached to the base to contain the generally planer cavity 104 there between. The two holes, 401 and 402, are essentially the same as in the embodiment of FIG. 2. However, in the embodiment of FIG. 6, the inlet 40 of the fuel conduit 24D is inserted into hole 401 and sealed to prevent leakage as fuel passes from the outlet 20 of the pump 10 into the fuel conduit 24D. After the fuel passes along the tortuous path within the fuel conduit 24D, it flows from the outlet 26 into hole 402 of the base 100. Like the inlet 40, the outlet 26 is provided with an appropriate seal to prevent leakage as the fuel flows from the fuel conduit into the fuel line 180 and to the internal combustion engine. Both of the fuel conduits, 24C and 24D, shown in FIG. 6 are shaped to fit into the space of the generally planer cavity 104. Since the inlets and outlets of the fuel conduits are sealed with respect to holes 401 and 402, coolant water can flow through the generally planer cavity 104 and around the external surfaces of the fuel conduits to provide cooling to the fuel within the conduits without fear of mixing the coolant with the fuel. The flow of the coolant through the generally planer cavity 104 is similar to that described above in FIG. 2, wherein it enters through the inlet 110 of the manifold 108 and exits through the outlet 114. It should be understood that fuel conduit 24C and fuel conduit 24D, although both illustrated in FIG. 6, are alternatives and are typically not used in conjunction with each other. Fuel conduit 24C is bent to form a serpentine path, whereas fuel conduit 24D is bent to form a spiral shape. It should also be understood that the specific shape in which the fuel conduit is bent is not limiting to the present invention.

Each of these several embodiments of the present invention described above provides certain significant advantages because of the basic characteristics of the fuel system. First, the filter 14 and pump 10 are attached directly to the base 100 to provide intimate thermal contact therebetween. This allows the heat exchanger within the generally planer cavity 104 to cool the filter and pump. In addition, connecting hoses between the various components have been eliminated to significantly reduce the overall volume of fuel stored within the fuel supply system when the engine is shut off. As a result, a significantly lower amount of fuel must be cooled when the engine is again turned on. This lesser amount of fuel stored within the fuel supply system allows the present invention to rapidly reduce the temperature of the stored fuel even if it has absorbed significant heat from the engine while it was turned off. Furthermore, the reduced number of components of the present invention, which is possible because of its overall structure, reduces the cost of the fuel supply system.

Although not illustrated in detail in FIGS. 2–6, it should be understood that the heat insulating container 45, of FIG. 1 is disposed around the assembly of components of the present invention to further allow the heat exchanger to work effectively within its thermally isolated volume. A heat insulative containment, generally similar to the one used with the present invention, is described and illustrated in significant detail in patent application Ser. No. 08/866,962 which is described above.

Although the present invention has been described in considerable detail and illustrated to show several preferred embodiments of the present invention, it should be understood that alternative embodiments are also within its scope.

We claim:

1. A fuel supply system for an internal combustion engine, comprising:
   a base having a cavity formed therein;
   a fuel conduit disposed within said cavity;
   a manifold for directing a coolant into said cavity in thermal communication with said fuel conduit;
   a fuel pump attached to said base, an outlet of said pump being connected, through a first passage in said base, in fluid communication with an inlet end of said fuel conduit
   a filter attached directly to said base, an outlet of said filter being connected, through a second passage in said base, in fluid communication with an inlet of said pump, an inlet of said filter being connected in fluid communication with a fuel tank, an outlet end of said fuel conduit being connected in fluid communication with a fuel system of said internal combustion engine.

2. The fuel supply system of claim 1, further comprising:
   a heat insulated housing containing said base, said manifold, said fuel pump, and said filter.

3. The fuel supply system of claim 1, wherein:
   said base is made of a metal.

4. The fuel supply system of claim 3, wherein:
   said base is made of aluminum.

5. The fuel supply system of claim 1, wherein:
   said base is made of a nonmetallic material.

6. The fuel supply system of claim 1, wherein:
   said fuel conduit is formed in a thin sheet of metal by pressing a serpentine pattern into said thin sheet.

7. The fuel supply system of claim 1, wherein:
   said fuel conduit is formed by machining a channel into a surface of a metallic plate.

8. The fuel supply system of claim 1, wherein:
   said fuel conduit comprises a metallic tube disposed within said cavity, said inlet of said fuel conduit being connected to said first passage in said base, said outlet end of said fuel conduit being connected to said second passage in said base.

9. The fuel supply system of claim 8, wherein:
   said metallic tube is bent to form a serpentine shape.

10. The fuel supply system of claim 8, wherein:
    said metallic tube bent to form a spiral shape.

11. The fuel supply system of claim 1, wherein:
    said cavity is a generally planar cavity formed within said base and contained between said base and said manifold.

12. A fuel supply system for an internal combustion engine, comprising:
    a base having a generally planar cavity formed therein;
    a fuel conduit disposed within said generally planar cavity;
    a manifold for directing a coolant into said generally planar cavity in thermal communication with said fuel conduit;
    a fuel pump attached to said base, an outlet of said pump being connected, through a first passage in said base, in fluid communication with an inlet end of said fuel conduit; and
    a filter attached directly to said base, an outlet of said filter being connected, through a second passage in said base, in fluid communication with an inlet of said pump, an inlet of said filter being connected in fluid communication with a fuel tank, an outlet end of said fuel conduit being connected in fluid communication with a fuel system of said internal combustion engine.

13. The fuel supply system of claim 12, further comprising:
    a heat insulated housing containing said base, said manifold, said fuel pump, and said filter.

14. The fuel supply system of claim 12, wherein:
    said base is made of a nonmetallic material.

15. The fuel supply system of claim 12, wherein:
    said fuel conduit is formed in a thin sheet of metal by pressing a serpentine pattern into said thin sheet.

16. The fuel supply system of claim 12, wherein:
    said fuel conduit is formed by machining a channel into a surface of a metallic plate.

17. The fuel supply system of claim 12, wherein:
    said fuel conduit comprises a metallic tube disposed within said generally planar cavity, said inlet of said fuel conduit being connected to said first passage in said base, said outlet end of said fuel conduit being connected to said second passage in said base.

18. The fuel supply system of claim 17, wherein:
    said metallic tube is bent to form a serpentine shape.

19. The fuel supply system of claim 17, wherein:
    said metallic tube bent to form a spiral shape.

20. A fuel supply system for an internal combustion engine, comprising:
    a base having a generally planar cavity formed therein;
    a fuel conduit disposed within said generally planar cavity;
    a manifold for directing a coolant into said generally planar cavity in thermal communication with said fuel conduit;
    a fuel pump attached to said base, an outlet of said pump being connected, through a first passage in said base, in fluid communication with an inlet end of said fuel conduit;
    a filter attached directly to said base, an outlet of said filter being connected, through a second passage in said base, in fluid communication with an inlet of said pump, an inlet of said filter being connected in fluid communication with a fuel tank, an outlet end of said fuel conduit being connected in fluid communication with a fuel system of said internal combustion engine; and
    a heat insulated housing containing said base, said manifold, said fuel pump, and said filter.

* * * * *